(12) United States Patent
Fortenberry

(10) Patent No.: US 11,433,825 B1
(45) Date of Patent: Sep. 6, 2022

(54) HOOK MEMBER FOR ATTACHING ITEM TO WINDOW OF VEHICLE

(71) Applicant: Caleb Chandler Fortenberry, D'Iberville, MS (US)

(72) Inventor: Caleb Chandler Fortenberry, D'Iberville, MS (US)

( * ) Notice: Subject to any disclaimer, the term of this patent is extended or adjusted under 35 U.S.C. 154(b) by 0 days.

(21) Appl. No.: 17/172,809

(22) Filed: Feb. 10, 2021

(51) Int. Cl.
B60R 9/02 (2006.01)
B60R 11/00 (2006.01)

(52) U.S. Cl.
CPC ......... B60R 9/02 (2013.01); *B60R 2011/0026* (2013.01)

(58) Field of Classification Search
CPC .. B60R 9/02; B60R 7/10; B60R 11/00; B60R 2011/0026
USPC .................................................. 224/482, 556
See application file for complete search history.

(56) References Cited

U.S. PATENT DOCUMENTS

| | | | | |
|---|---|---|---|---|
| 1,726,316 A | * | 8/1929 | Saxton | A47G 25/08 33/8 |
| 1,921,462 A | * | 8/1933 | Graham | B60N 3/007 224/482 |
| 2,344,339 A | * | 3/1944 | Zwald | B60R 7/10 224/927 |
| 2,346,276 A | * | 4/1944 | Reittinger | A47G 25/08 224/558 |
| 2,474,513 A | * | 6/1949 | Behrens | B60R 9/02 224/927 |
| 2,547,883 A | * | 4/1951 | Olson | B60R 7/08 108/45 |
| 2,557,537 A | * | 6/1951 | Ellison | A47G 25/32 224/927 |
| 2,609,104 A | * | 9/1952 | Leach | B60R 7/10 224/927 |
| 4,068,817 A | | 1/1978 | Berger | |
| 4,495,735 A | * | 1/1985 | Elkins | B60R 7/10 224/927 |
| 4,561,685 A | | 12/1985 | Fischer | |
| 4,609,205 A | * | 9/1986 | McKeever | B60R 22/19 297/483 |
| 4,889,268 A | * | 12/1989 | Shubeck | G09F 21/04 211/89.01 |
| 4,933,691 A | * | 6/1990 | Leslie | B60R 11/04 396/428 |
| 4,941,602 A | * | 7/1990 | Wells | B60R 9/02 224/560 |
| 5,285,938 A | * | 2/1994 | Fauchald | F16M 13/00 224/567 |
| 5,287,871 A | * | 2/1994 | Trice | B60J 11/00 135/21 |
| 5,388,738 A | * | 2/1995 | Russell | B60R 9/08 224/544 |

(Continued)

*Primary Examiner* — Justin M Larson
(74) *Attorney, Agent, or Firm* — George L Williamson

(57) ABSTRACT

Method and apparatus for attachment to the window of a vehicle which enables the window to bear a heavy load such as a trash bag for the purpose of transporting the load attached outside the vehicle. The device attaches to the top horizontal edge of an electrically actuated window so that the window can be rolled up into the track of the window track so that the window and hook are held securely in place without actuating the anti-pinch alarm of the window of the vehicle when the window is completely rolled up.

12 Claims, 1 Drawing Sheet

(56) References Cited

U.S. PATENT DOCUMENTS

| | | | | |
|---|---|---|---|---|
| 5,390,837 A | * | 2/1995 | Ruffolo, Jr. | B60R 9/06 |
| | | | | 224/570 |
| 5,645,203 A | * | 7/1997 | Tappenden | B60R 11/00 |
| | | | | 224/482 |
| 5,676,284 A | * | 10/1997 | Schenberg | A47G 25/08 |
| | | | | 224/313 |
| 5,890,689 A | * | 4/1999 | Johnson | B60R 7/10 |
| | | | | 224/927 |
| 6,032,842 A | * | 3/2000 | Brickner | B60R 9/02 |
| | | | | 224/571 |
| 6,095,477 A | * | 8/2000 | Pohlman | B60R 11/00 |
| | | | | 248/452 |
| 6,298,590 B1 | * | 10/2001 | Levinson | G09F 21/04 |
| | | | | 40/643 |
| 6,863,249 B1 | | 3/2005 | Alvord | |
| 8,479,962 B2 | * | 7/2013 | Hall | B60R 11/00 |
| | | | | 224/567 |
| 8,505,795 B2 | * | 8/2013 | Dunn | B60R 11/00 |
| | | | | 224/567 |
| 10,196,202 B1 | * | 2/2019 | Clavizzao | B60N 3/08 |
| 2002/0040916 A1 | * | 4/2002 | Hibbs | B60R 9/02 |
| | | | | 224/482 |
| 2004/0124972 A1 | * | 7/2004 | Strzelczyk | E05F 15/43 |
| | | | | 180/271 |
| 2006/0291985 A1 | | 12/2006 | Sullivan | |
| 2013/0108190 A1 | | 5/2013 | Flowers et al. | |
| 2013/0256354 A1 | * | 10/2013 | Clark | A47G 25/06 |
| | | | | 224/482 |
| 2016/0101742 A1 | * | 4/2016 | Mershon | B60R 11/00 |
| | | | | 224/482 |

* cited by examiner

HOOK MEMBER FOR ATTACHING ITEM TO WINDOW OF VEHICLE

BACKGROUND OF THE INVENTION

Field of the Invention

The present invention relates generally to accessories for automobiles, and more particularly, is concerned with a hook member device that can be attached to the window of a door of a vehicle for carrying items.

Description of the Related Art

Devices relevant to the present invention have been described in the related art; however, none of the related art devices disclose the unique features of the present invention. In U.S. Pat. No. 6,863,249 dated Mar. 8, 2005, Alvord disclosed a device for hauling garbage bags. In U.S. Pat. No. 4,561,685 dated Dec. 31, 1985, Fischer disclosed a protective pad for side of motor vehicle. In U.S. Patent Application Publication No. U.S. 2006/0291985 dated Dec. 28, 2006, Sullivan disclosed a lightweight device for conveniently attaching and transporting household waste receptacles behind vehicles. In U.S. Patent Application Publication No. U.S. 2013/0108190 dated May 2, 2013, Flowers, et al., disclosed a trash bag supporting device. In U.S. Pat. No. 4,068,817, dated Jan. 17, 1978, Berger disclosed a suspension hanger.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a device for attachment to the window of a vehicle which enables the window to bear a heavy load for the purpose of transporting the load which is attached outside the vehicle. The item of the load could be a bag or other similar heavy item. The present invention attaches to the top edge of a vehicle window so that the window can be rolled all the way up into the upper horizontal portion of the window track so that the window and hook member is securely held in place. The present invention attaches to the window and the exterior of the present invention uses friction to help lock the present invention into place inside the window frame. The hook portion of the present invention is able to bear the weight of the load. The present invention could be attached to the top edge of a partially rolled up window or a completely rolled up window and is designed to fit into the track of the window without actuating the anti-pinch safety mechanisms of the window of the vehicle when the window is completely rolled up.

An object of the present invention is to enable a vehicle to carry a heavy load attached to the outside of the vehicle. A further object of the present invention is to provide a device which can be easily attached to the window of a vehicle. A further object of the present invention is to provide a device which can be easily attached to the upper edge of a window of a vehicle and completely rolled up without actuating the anti-pinch safety mechanisms of the vehicle. A further object of the present invention is to provide a means to carry heavy loads which can be easily operated by a user. A further object of the present invention is to provide a means for carrying loads which can be relatively easily and inexpensively manufactured.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
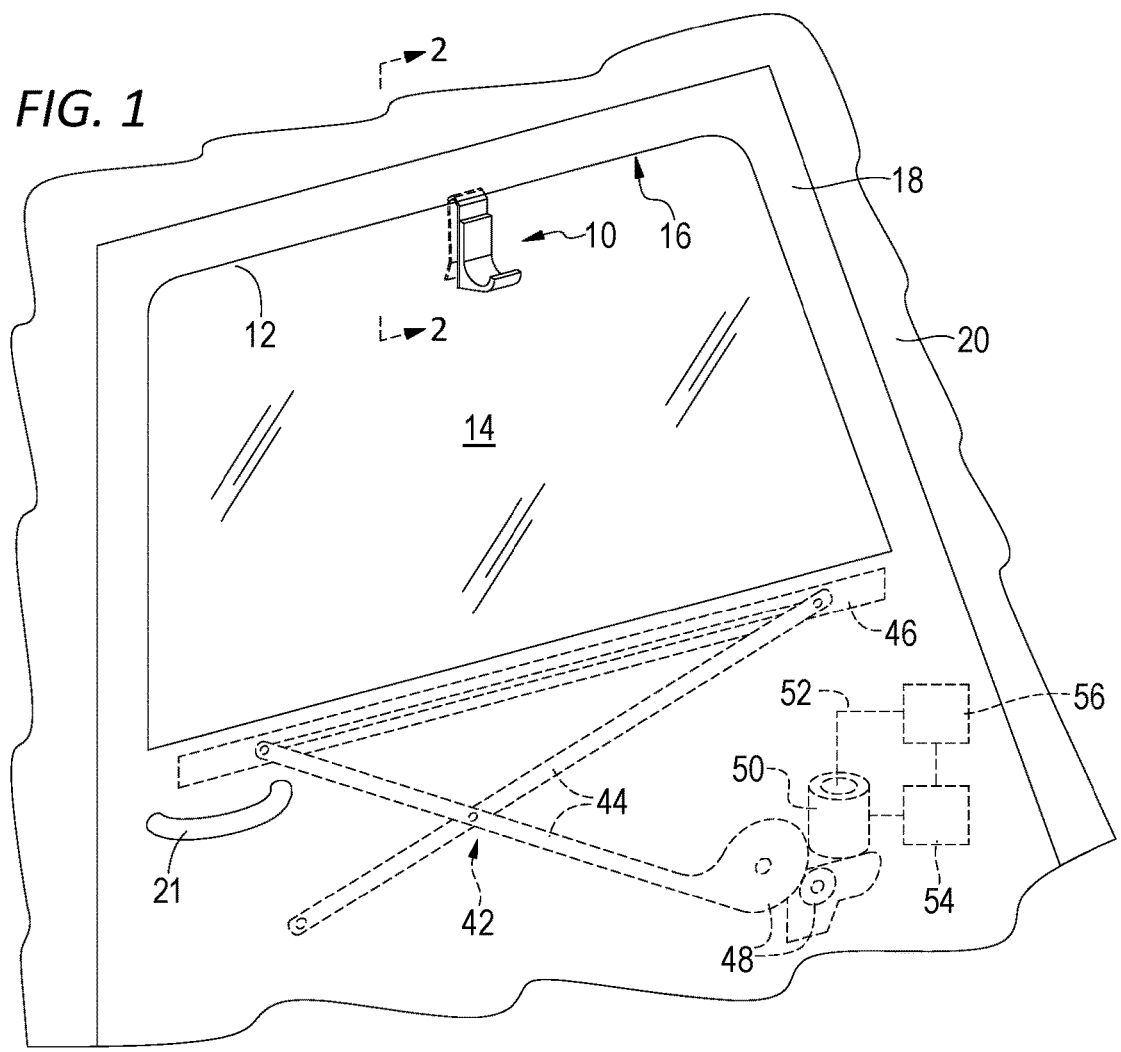
FIG. 1 is a perspective view of the present invention shown in operative connection.

With regard to reference numerals used, the following numbering is used throughout the drawings.

- 10 present invention
- 12 top edge of window
- 14 window
- 16 window track
- 18 outer door frame
- 19 inner door frame
- 20 vehicle
- 21 door handle
- 22 hook
- 24 base
- 26 clip
- 28 outer portion of clip
- 30 inner portion of clip
- 32a upper portion of clip
- 32b upper portion of clip
- 34 drawstring
- 36 item
- 38 lower tip of inner portion of clip
- 40 textured area
- 42 window regulator
- 44 regulator arms
- 46 window track
- 48 gear drive
- 50 window motor
- 52 wiring harness
- 54 electronic control unit
- 56 anti-pinch sensor/alarm

DETAILED DESCRIPTION OF THE PREFERRED EMBODIMENT

Figure 2:
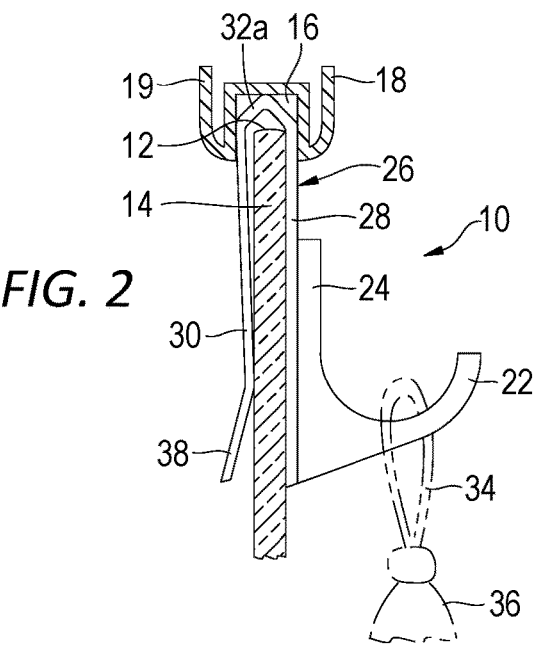
FIG. 2 is a cross sectional view of one embodiment of the present invention shown in operative connection taken from FIG. 1 as indicated.

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 2 illustrate the present invention wherein a device for carrying heavy loads for attachment to the window of a vehicle is disclosed and which is generally indicated by reference number 10.

Turning to FIG. 1, therein is shown a perspective view of the present invention 10 being a device for attachment to the upper edge 12 of a window 14 which window is slidable in a window track 16 of a door member 18 of a vehicle 20 which has a conventional handle 22 on the door so that the door can be easily opened and closed by a user. The present invention 10 discloses a device for attachment to the window 14 of a vehicle 20 which enables the window to bear a heavy load for the purpose of transporting the load which is attached outside the vehicle. The article or load could be any type of article, item, bag, trash bag or other similar heavy item. The present invention 10 attaches to the top horizontal edge 12 of an electrically or mechanically actuated window 14 so that the window can be completely rolled up into the upper horizontal track 16 of the window track so that the window is securely held in place. The present invention 10 attaches to the window 14 and the exterior (See FIG. 3 at 40) of the present invention adds friction to help lock the present invention into place. The hook portion 22 of the present invention 10 is able to bear the weight of the load. The present invention 10 could be attached to the top edge of a partially rolled up window 14 or a completely rolled up window 14 and is designed to fit into the track 16 of the window without actuating the anti-pinch window alarm of the vehicle 20 when the window is completely rolled up. Also shown is the window regulator 42 for raising or lowering the window 14 including regulator arms 44 and the window track 46 along with a gear drive 48 driven by window motor 50 which is electrically connected to an electronic control unit 54 via an electrical wiring harness 52 which also connects to the anti-pinch device sensor/alarm 56.

Turning to FIG. 2, therein is shown a cross sectional view of the present invention 10 along with the top edge 12 of the window 14 and also showing the cross sectional view of the window track 16 along with the outer and inner frame of the door 18, 19. The present invention 10 has a hook member 22 extending outwardly away from its base member 24 which provides means upon which an item 36 having or not having a draw string 34 can be hung over the hook member 22 of the present invention 10 so that the item 36 can be carried by the present invention attached to the window 14 of the vehicle 20. The present invention 10 has a clip member 26 which includes an outer member 28 of the clip along with an inner portion 30 of the clip wherein the inner portion also has a lower tip 38 of the inner portion of the tip which is abruptly oppositely disposed away from the outer member 28 of the clip to create an enlarged space so that it can receive and be easily placed over the top edge 12 of the window 14. The present invention 10 also has an upper portion 32a which portion is downwardly V-shaped being designed to fit snugly into the window track 16 without actuating an alarm of the vehicle 20.

Figure 3:
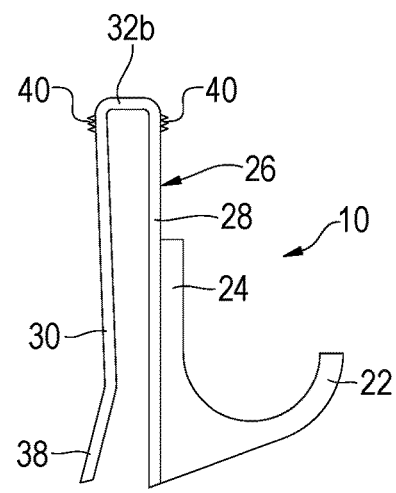
FIG. 3 is a side view of a second embodiment of the present invention.

Turning to FIG. 3, therein is shown a side view of the present invention 10 including an alternative embodiment of the upper portion of the clip 32b which is generally downwardly squared or downwandly U-shaped at its top or apex portion to fit snugly into the window track 16 without actuating an alarm of the vehicle 20. Also shown is a textured or serrated area 40 near the upper portion of the clip 32b which creates a frictional area to help lock the present invention into place inside the window frame 18, 19. Some experimentation will be needed to design the textured area 40 in order to prevent activation of the anti-pinch alarm 56.

The present invention 10 is designed to work on modern day vehicles 20 have anti-pinch devices 56 on the windows 14 thereof. The windows 14 of modern day automobiles/vehicles 20 are equipped with anti-pinch devices 56 which work by measuring the amount of electrical current used by the motor 50 which drives the window glass 14 up and down. Like practically everything on a modern car 20, the windows 14 are controlled by an electronic control unit (ECU) 54. When a user operates the switch for the window 14 to go up or down, it sends a signal to the ECU 54 that the user wants the window 14 to go up or down, so the ECU energizes the motor 50 and the window goes up or down. During the trip, the window motor 50 will draw current within a certain range, which the ECU 54 keeps track of. If the glass 14 runs into an obstruction on the way up, the load on the motor 50 increases and it draws more than the normal current which the ECU 54 senses and then applies reverse voltage to lower the window a few inches. In order to prevent this from happening, the present invention 10 is designed to avoid putting pressure on the top edge 12 of the window 14 in the space of the windows track 16 by designing the top/upper portion of the clip 32a, 32b to have a thin profile and be sized and shaped to fit tightly and snugly inside the window track 16 so as to be non-obstructive or non-pinching to avoid activating the anti-pinch device 56 of the vehicle 20.

By way of summary and by making reference to FIGS. 1-3, the present invention 10 discloses a clip 26 for attachment to an upper horizontal edge 12 of an automobile/vehicle window 14, the automobile/vehicle having a door 18 with a window track 16 and an anti-pinch alarm 56, including (a) the clip having an upper portion 32a, 32b having an outer portion 28 and an inner portion 30, wherein the outer portion extends downwardly on an outside of the window, wherein the inner portion extends downwardly on an inside of the window, the inner portion having a lower tip 38 being spaced away from a lower tip of the outer portion having a space therein for receiving the window therein; (b) forming a hook 22 on the outer portion of the clip for attaching an item 36 thereto; and, (c) forming the upper portion with a width which is less than a width of the window track to permit the window track to receive the upper portion therein when the automobile window is rolled completely up without actuation of the anti-pinch alarm. Furthermore, the upper portion has the shape of a downwardly disposed V or the shape of a downwardly disposed U; wherein the clip is wider at its upper end than its lower end and has a textured area 40 on the outer and inner portions of the upper portion to create friction between the clip and the window track and the lower tip of the inner and outer portions of the clip are biased toward each other to hold the window securely thereinbetween.

I claim:
1. A clip for attachment to an upper horizontal edge of a vehicle window, the vehicle having a door with a window track and an anti-pinch alarm, comprising:
  (a) a clip, said clip having an upper portion having an outer portion and an inner portion, wherein said outer portion extends downwardly on an outside of the window, wherein said inner portion extends downwardly on an inside of the window, said inner portion having a lower tip being spaced away from a lower tip of said outer portion having a space therein for receiving said window therein;
  (b) a hook disposed on said outer portion of said clip for attaching an item thereto;
  (c) a serrated area adjacent said upper portion of said clip located on an outer surface of each of said inner and outer portion extending downwardly along said window for creating frictional areas to help lock said clip into place; and

(d) wherein said upper portion has a width which is less than a width of the window track to permit the window track to receive said upper portion therein when the vehicle window is rolled completely up without actuation of the anti-pinch alarm.

2. The clip of claim 1, wherein said upper portion has the shape of a downwardly disposed V.

3. The clip of claim 1, wherein said upper portion has the shape of a downwardly disposed U.

4. The clip of claim 1, wherein the clip is wider at its upper and than its lower end.

5. The clip of claim 1, in which said outer portion extending downwardly along said window has a lower tip which is abruptly oppositely disposed away from said window to create an enlarged space so that said clip can be easily placed over a top edge of said window.

6. The clip of claim 1, wherein said lower tip of said inner and outer portions of said clip are biased toward each other to bold the window securely thereinbetween.

7. A method of assembling a clip for attachment to an upper horizontal edge of a vehicle window, the vehicle having a door with a window track and an anti-pinch alarm, comprising the steps of:
(a) providing a clip, the clip having an upper portion having an outer portion and an inner portion, wherein the outer portion extends downwardly on an outside of the window, wherein the inner portion extends downwardly on an inside of the window, the inner portion having a lower tip being spaced away from a lower tip of the outer portion having a space therein for receiving the window therein;
(b) forming a hook on the outer portion of the clip for attaching an item thereto;
(c) forming a serrated area adjacent said upper portion of said clip located on an outer surface of each of said inner and outer portions extending downwardly along said window for creating frictional areas to help lock said clip into place; and
(d) forming the upper portion with a width which is less than a width of the window track to permit the window track to receive the upper portion therein when the vehicle window is rolled completely up without actuation of the anti-pinch alarm.

8. The method of claim 7, wherein the upper portion has the shape of a downwardly disposed V.

9. The method of claim 7, wherein the upper portion has the shape of a downwardly disposed U.

10. The method of claim 7, wherein the clip is wider at its upper and than its lower end.

11. The method of claim 7, in which said outer portion extending downwardly along said window has a lower tip which is so that said clip can be easily placed over a top edge of said window.

12. The method of claim 7, wherein the lower tip of the inner and outer portions of the clip are biased toward each other to hold the window securely thereinbetween.

\* \* \* \* \*